United States Patent [19]

Ruhnau et al.

[11] 4,360,918
[45] Nov. 23, 1982

[54] ARRANGEMENT FOR DETECTING DEFECTS DURING THE ASYNCHRONOUS TRANSFER OF DIGITAL MEASURED VALUES

[75] Inventors: Garhard Ruhnau; Klaus Pape; Rudolf Auding, all of Hanover, Fed. Rep. of Germany

[73] Assignee: WABCO Fahrzeugbremsen GmbH, Hanover, Fed. Rep. of Germany

[21] Appl. No.: 179,355

[22] Filed: Aug. 18, 1980

[30] Foreign Application Priority Data

Sep. 8, 1979 [DE] Fed. Rep. of Germany ....... 2936439

[51] Int. Cl.³ .......................... G06F 11/00; B60T 8/00
[52] U.S. Cl. ........................................ 371/69; 303/92; 364/426
[58] Field of Search ...................... 371/69, 70, 32, 33; 303/92; 364/426

[56] References Cited

U.S. PATENT DOCUMENTS

| | | | |
|---|---|---|---|
| 3,252,139 | 5/1966 | Moore | 371/69 |
| 3,427,585 | 2/1969 | Milford | 371/70 |
| 3,876,980 | 4/1975 | Haemmig et al. | 371/69 |
| 4,019,172 | 4/1977 | Syodes | 371/69 |
| 4,093,823 | 6/1978 | Chu | 371/33 |
| 4,093,825 | 6/1978 | Gladstone et al. | 371/69 |
| 4,109,234 | 8/1978 | Davis | 303/92 |
| 4,113,321 | 9/1978 | Bleckmann | 303/92 |

Primary Examiner—Charles E. Atkinson
Attorney, Agent, or Firm—J. B. Sotak

[57] ABSTRACT

An arrangement for detecting defects during the asynchronous transfer of digital measured values in a microcomputer system including an input circuit for producing the digital measured values. A storage register temporarily stores the digital measured values received from the input circuit. A multiplexer transmits the stored digital measured values to a microcomputer for further processing. The stored digital measured values are consecutively transmitted twice so that the microcomputer performs a comparison of both of the digital measured values. If both of the digital measured values are the same, the microcomputer processes the digital measured values. If the digital measured values are different, the multiplexer repeats the double transmission of the digital measured values.

1 Claim, 4 Drawing Figures

ARRANGEMENT FOR DETECTING DEFECTS DURING THE ASYNCHRONOUS TRANSFER OF DIGITAL MEASURED VALUES

FIELD OF THE INVENTION

This invention relates to a circuit arrangement for detecting errors during the asynchronous transmission of digital measured values.

BACKGROUND OF THE INVENTION

It is customary in digital electronic circuits to transmit parallel existing binary coded digital words with the use of data selectors (multiplexers) serially into a microcomputer. The multiplexer successively connects each of its parallel existing input data lines as a function of control signals to its inputs (address inputs) provided for this with a common output data line. Since the control signals are likewise binary coded, three control signals (address lines) are required to transmit a data word of 8-bit length, and four control signals are necessary to transmit a data word of 16-bit length, in order to be able to control each individual bit to be transmitted.

Frequently, the input circuit and the microcomputer operate asynchronously, that is, they function independently of each other. Thus, the production of measured values and the subsequent processing of these measured values have no firm of permanent time relationship.

A generally known method for the transmission of measured values in the case of asynchronous production and processing of the measured values consists in the fact that the microcomputer is signaled at the occurrence of a new measured value by controlling an interrupt line. The microcomputer then interrupts the running program, takes over the new measured value and subsequently processes the original program again (COMPUTER DESIGN, November 1976, p. 142–143).

However, this method has the disadvantage that an unnecessarily large amount of computing time is used for processing of interrupt programs, even if not all new measured values are needed. Furthermore, the task of wiring technique is relatively difficult and expensive.

It will be appreciated that in an asynchronous transmission system, the calculation of a new measured value and the transmission into the microcomputer are events taking place independent of each other so that erroneous measured values are transmitted when the measured value changes during the serial transmission through the multiplexer into the microcomputer.

OBJECTS OF THE INVENTION

It is an object of the invention to create a simple yet effective circuit arrangement for the asynchronous transmission of electrical measured values, to a microcomputer in which erroneous measured values are recognized and eliminated from further processing.

Another object of this invention is to provide an arrangement for recognizing errors during the asynchronous transmission of digital measured values into a microcomputer comprising, an input circuit for producing the digital measured values, an intermediate storage circuit having a plurality of input data lines for placing the digital measured values in parallel in said intermediate storage circuit in response to a pulse on a control line, a multiplexer coupled to said intermediate storage circuit for serially feeding the digital measured values into a microcomputer a first time and then a second time over a common data line in response to signals on address lines leading from said microcomputer to said multiplexer, and said microcomputer compares the first digital measured values with the second digital measured values to determine equality for causing further processing by said microcomputer when equality exists and for causing the dual transmission of the digital measured values when an inequality exists between the first and second digital measured values.

A special type of error can occur when the hardware, that is for example, when the input switching circuit is out of order or is functioning improperly. It will be appreciated that typical binary numbers appear as measured values which consist only of a series of ones or zeros. It has been found that certain specific hardware errors cannot be recognized directly by a mere double transmission since both transmitted values are the same in each case.

In order to be able to recognize such a special type of fault in the measured values it is necessary to provide an added feature to the invention. That is, an upper and a lower boundary value interrogation for measured values is added in the program of the minicomputer.

The arrangement according to the invention can be used, for example, in an anti-skid system for braking of a vehicle. In such a braking system, the movements of the wheels are scanned by sensors. The sensor signals are counted out and the thus obtained binary measured values are evaluated in a logic switching. The wheel brakes are alternately-released and applied by the output signals of the logic circuit.

Since the function of the the anti-skid vehicle braking system must function in a safe manner, very high requirements are placed on the reliability of the electronic devices.

BRIEF DESCRIPTION OF THE DRAWINGS

A preferred embodiment of the invention is shown in the accompanying drawings in which.

DETAILED DESCRIPTION OF THE INVENTION

Figure 1:
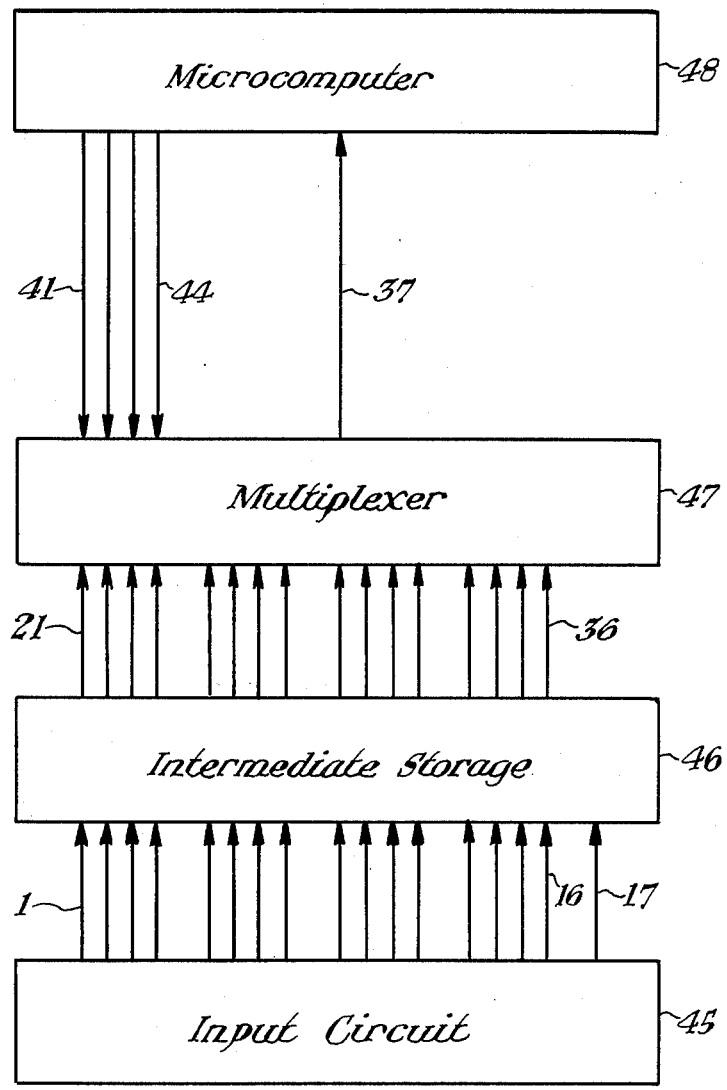
FIG. 1 shows a block circuit diagram of a digital measured value transmission network in accordance with the present invention.

In viewing FIG. 1, it will be seen that the block circuit diagram includes a measured value transmission network for the transmission of digital measured values which are produced by an input circuit 45. The transmission network consists of the in-series switching of input circuit 45, an intermediate storage circuit 46, a multiplexer 47 and a microcomputer 48. The first three named electronic units or building blocks are placed on a common chip. The described measured value transmission network functions as a communication link for transmitting the measured values from the place of production to the place of processing in a vehicle anti-skid braking system.

The input circuit 45 is connected with the intermediate storage 46 over sixteen input data conductor or lines 1 to 16 and includes a control line (cycle line 17). The newly produced measured value is shifted over into the intermediate storage 46 by the positive edge of signal pulse appearing on the cycle line 17.

The measured value takes the form of a binary coded number of 16-bit length.

The intermediate storage 46 serves to temporarily hold or store the measured values which are naturally occurring only for a very short time in the input circuit 45, for a longer time. That is the initial values are stored until the appearance of the next measuring value.

The sixteen outputs 21 to 36 of the intermediate storage are fed to the respective inputs of the multiplexer 47 (data selector).

The signals on the address lines 41 to 44 of the microcomputer 48 operates the serial transfer of the data from the intermediate storage 46 over the common data line 37 to the microcomputer 48. Since the data word to be transmitted consists of 16 bits the four address lines, which are likewise binary coded, are required to control each individual bit.

Figure 2A:
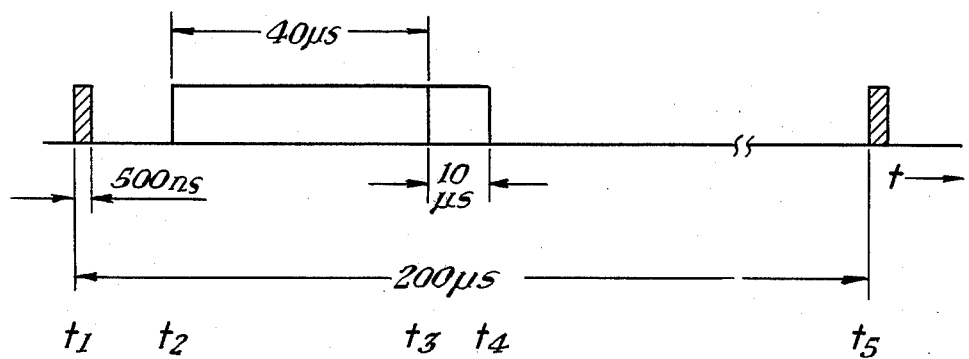
FIGS. 2a, 2b show diagrams for explaining the time cycle of the individual operations.
Figure 2B:
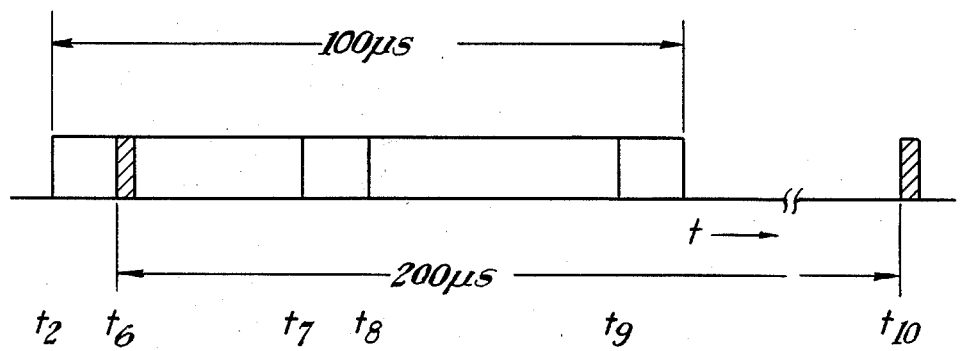

The sequence of operations occurring during data transmission is shown in FIGS. 2a and 2b. In FIG. 2a, there is shown the case where the data transmission between the multiplexer 47 and the microcomputer 48 is not interfered with by a simultaneous transmission of information into the intermediate storage 46, and in FIG. 2a there is shown the case where during a data transmission between the multiplexer 47 and the microcomputer 48, a new measured value is loaded into the intermediate storage 46, that is, there is interference during the transmission.

Thus, FIGS. 2a and 2b show the timing sequence of the individual operations which are mentioned above.

As shown, at time $t_1$, a new measured value is shifted into the intermediate storage. In the present example, this operation lasts only about 500 ns.

After the expiration of an indefinite period of time and at time point $t_2$, the measured value stored in the intermediate storage 46 is transmitted through the multiplexer 47 into the microcomputer 48. A double transmission takes place (see FIG. 3) which lasts for about 40 $\mu$s.

At time point $t_3$, the first comparison of both transmitted values takes place. This comparison lasts about 10 $\mu$s.

In instances where the first double transmission and the subsequent comparison result in unequal values, the double transmission is repeated (see FIG. 2b), and the latter transmission is followed by another comparison. The total time needed for the two double transmissions amounts to about 100 $\mu$s.

At time point $t_5$, again after an undetermined period of time, the next measured value is entered into the intermediate storage 46. Assuming maximum vehicle speed and in turn, the highest sensor frequency, the minimum time interval between the two successive measured values amounts to about 200 $\mu$s.

In reviewing FIG. 2b, it will be observed that in the example shown, the storing of the new measured value at time point $t_6$ takes place within the first double transmission of the initial measured values to the microcomputer 48 if we assume that the transmission begins like in FIG. 2a at time point $t_2$. Thus, any comparison of just measured values taking place before time point $t_7$ will be out of agreement. Subsequently, the double transmission time point $t_8$. The second comparison undertaken at point in time $t_9$ now will be in agreement so that the measuring value can be released for further processing in the microcomputer 48. The storing of a new measuring value may take place at time point $t_{10}$.

Since a measuring value change or a new storage in the intermediate register 46 lasts only a relatively short time (about 500 ns), a double transmission lasts about 40 $\mu$s with the use of conventional component parts, and since a pause (about 10 $\mu$s) exists for the carrying out of the comparison between such transmissions, two successive double transmissions cannot be disturbed by a measured value change.

However, it will be seen that the time between two successive measured value changes in the intermediate storage 46 is at least 200 $\mu$s longer than the time that the microcomputer 48 needs to carry out two double transmissions, and therefore both successive transmission operations can thus not be disturbed by different measured value changes, when the data transmission network operates in a proper manner.

Figure 3:
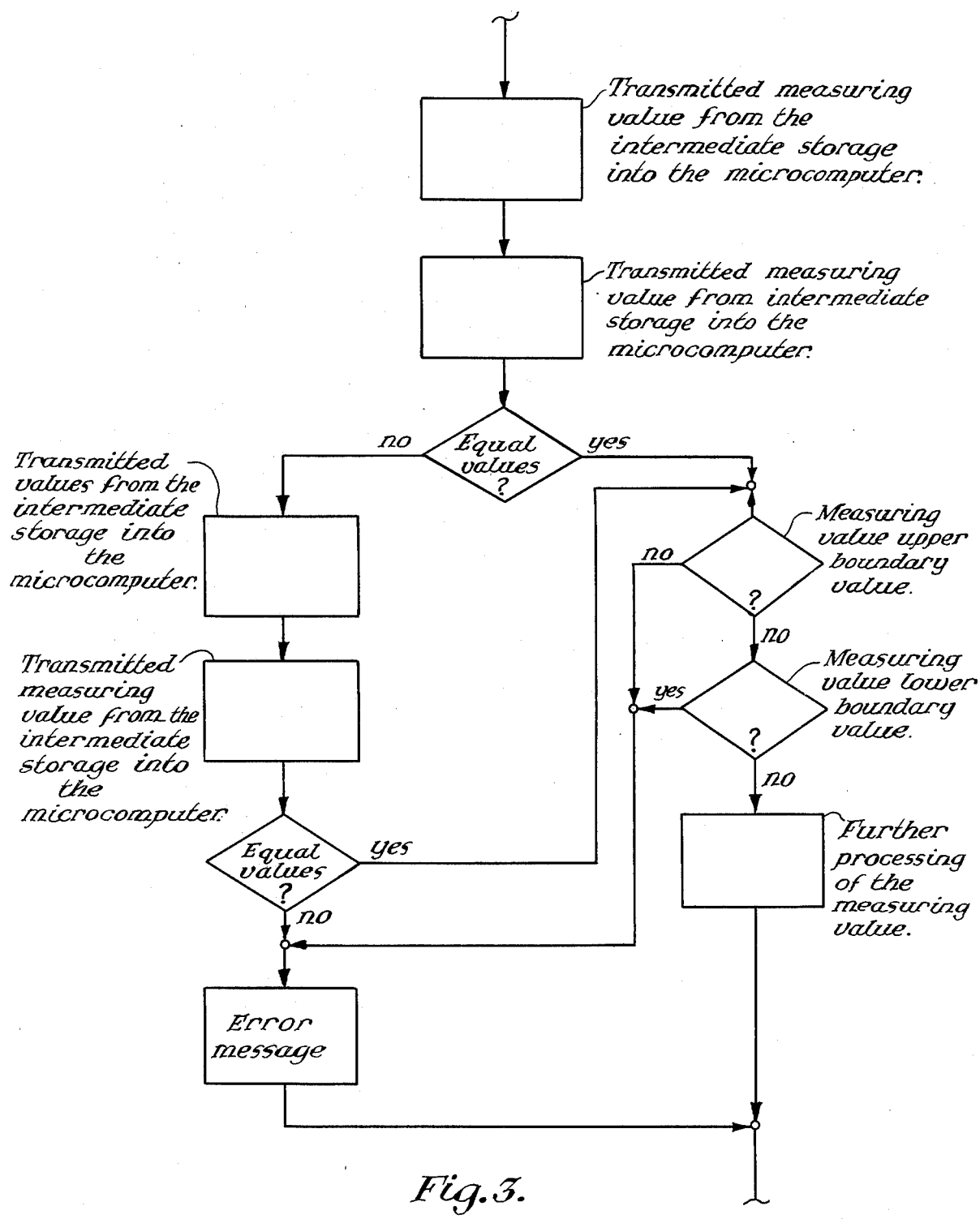
FIG. 3 shows a flowchart for recognition of hardware errors.

It will be seen that FIG. 3 shows the flowchart of a transmission program which may be briefly explained in the following manner.

As already mentioned, after a first double transmission, a first comparison takes place and in the case of inequality a second double transmission and a second comparison is initiated. In case one or both these comparisons gives agreeing values and after it is subsequently determined that the measured value is within the upper and lower boundary value, a measured value is released for further processing in the microcomputer. The boundary value inquiry serves a means for recognizing hardware failures.

If both comparisons give unequal values, or in case the measuring values lie outside the limits of either of the boundary values, an error message is generated. Thus, the measured value is recognized as being disturbed so that no further processing is permitted. Further, if the following measured values are recognized as being disturbed, additional measures can be taken, such as, turning off the entire anti-skid brake control system.

Having now described our invention, what we claim as new and desire to secure by Letters Patent, is:

1. An arrangement for recognizing errors during the asynchronous transmission of digital measured values into a microcomputer comprising, an input circuit for producing the digital measured values, a plurality of data lines coupled between said input circuit and an intermediate storage circuit for feeding the digital measured values in parallel into said intermediate storage circuit in response to a pulse on a control line, a plurality of output lines coupled between said intermediate storage circuit and a multiplexer for feeding the digital measured values in parallel into said multiplexer, a common data line coupled between said multiplexer and a microcomputer for providing a first dual transmission of two successive digital measured values serially into said microcomputer in response to signals on a plurality of address lines leading from said microcomputer to said multiplexer, and said microcomputer compares the first measured values with the second measured values of said first dual transmission to determine equality for causing further processing by said microcomputer when equality exists and for causing a second dual transmission of the digital measured values when an inequality exists and also when the digital measured values lie outside the limits of an upper and lower boundary values and produces an error signal to prevent further processing when an inequality exists in both dual transmissions and also when the digital measured values of both transmissions lie outside of the upper and lower boundary values.

* * * * *